(12) United States Patent
Chatillon et al.

(10) Patent No.: US 11,892,175 B2
(45) Date of Patent: Feb. 6, 2024

(54) HEATING APPLIANCE WITH A BUILT-IN BATTERY ARRANGED IN THE INCOMING FRESH AIR FLOW

(71) Applicant: LANCEY ENERGY STORAGE, Grenoble (FR)

(72) Inventors: Yohann Chatillon, St jean de moirans (FR); Raphaël Meyer, Grenoble (FR); Gilles Moreau, Grenoble (FR)

(73) Assignee: LANCEY ENERGY STORAGE, Grenoble (FR)

( * ) Notice: Subject to any disclaimer, the term of this patent is extended or adjusted under 35 U.S.C. 154(b) by 301 days.

(21) Appl. No.: 16/764,713

(22) PCT Filed: Nov. 7, 2018

(86) PCT No.: PCT/FR2018/052745
§ 371 (c)(1),
(2) Date: May 15, 2020

(87) PCT Pub. No.: WO2019/097138
PCT Pub. Date: May 23, 2019

(65) Prior Publication Data
US 2021/0172612 A1    Jun. 10, 2021

(30) Foreign Application Priority Data

Nov. 16, 2017    (FR) .................................... 17/60818

(51) Int. Cl.
*F24D 13/02*    (2006.01)
*F24D 5/02*    (2006.01)
(Continued)

(52) U.S. Cl.
CPC ............. *F24D 13/022* (2013.01); *F24D 5/02* (2013.01); *F24D 19/0087* (2013.01);
(Continued)

(58) Field of Classification Search
CPC .... F24H 3/002; F24D 19/0087; F24D 13/022; F24D 19/06; F24D 5/02; F24D 2200/08;
(Continued)

(56) References Cited

U.S. PATENT DOCUMENTS 7,189,942 B2    3/2007    Yugo et al.
9,886,802 B2    2/2018    Ishii et al.
(Continued)

FOREIGN PATENT DOCUMENTS

DE    102016117729 A1    3/2017
DE    102019131379 A1    5/2020
(Continued)

OTHER PUBLICATIONS

English Translation of International Search Report for Application No. PCT/FR2018/052745.
(Continued)

*Primary Examiner* — Frantz F Jules
*Assistant Examiner* — Martha Tadesse
(74) *Attorney, Agent, or Firm* — CANTOR COLBURN LLP

(57) ABSTRACT

A heating appliance of the electric radiator type, including a housing containing a DC operated electrical energy storage device charged by an electrical power supply source outside the appliance, and at least one heating body that can be powered by the electrical power supply source and/or by the electrical energy storage device. The housing also comprises at least one air inlet arranged in a lower part of the housing to allow air to enter the space internally defined by the housing, and at least one air outlet arranged in an upper part of the housing to allow the air to leave the space. The electrical energy storage device is arranged across the air flow that circulates, in the space, from the at least one air inlet to the at least one air outlet, in a location situated, as (Continued)

observed in the direction of circulation of the flow, between the at least one air inlet and the at least one heating body.

20 Claims, 4 Drawing Sheets

(51) Int. Cl.
*F24D 19/00* (2006.01)
*F24D 19/06* (2006.01)
*H01M 10/615* (2014.01)
*H01M 10/6562* (2014.01)
*H01M 50/264* (2021.01)
*H01M 50/213* (2021.01)

(52) U.S. Cl.
CPC .......... *F24D 19/06* (2013.01); *H01M 10/615* (2015.04); *H01M 10/6562* (2015.04); *H01M 50/213* (2021.01); *H01M 50/264* (2021.01); *F24D 2200/08* (2013.01); *F24H 2240/01* (2013.01); *F24H 2240/09* (2013.01)

(58) Field of Classification Search
CPC ............. H01M 50/213; H01M 10/615; H01M 10/6562; H01M 50/264; Y02E 60/10
See application file for complete search history.

(56) References Cited

U.S. PATENT DOCUMENTS

| | | | |
|---|---|---|---|
| 10,906,367 B2 | 2/2021 | Christen | |
| 10,938,211 B2 | 3/2021 | Bell | |
| 2002/0005708 A1* | 1/2002 | Kobayashi | H01M 10/617 320/107 |
| 2005/0095499 A1* | 5/2005 | Kanai | H01M 10/0525 429/83 |
| 2008/0130232 A1 | 6/2008 | Yamamoto et al. | |
| 2011/0286725 A1 | 11/2011 | Otoole | |
| 2011/0300421 A1* | 12/2011 | Iritani | H01M 10/615 429/120 |
| 2013/0328527 A1 | 12/2013 | Kang | |
| 2014/0284022 A1* | 9/2014 | Maxbauer | B60H 1/2218 165/41 |
| 2016/0185241 A1 | 6/2016 | Kinomura | |
| 2018/0359813 A1 | 12/2018 | Meyer | |
| 2020/0329531 A1 | 10/2020 | Meyer et al. | |
| 2022/0080852 A1 | 3/2022 | Yu et al. | |

FOREIGN PATENT DOCUMENTS

| | | |
|---|---|---|
| DE | 102021123536 A1 | 3/2022 |
| EP | 2719044 B1 | 11/2015 |
| EP | 2599154 B1 | 11/2016 |
| EP | 3287710 A1 | 2/2018 |
| EP | 3734164 A1 | 11/2020 |
| FR | 2882132 A1 | 8/2006 |
| FR | 3034613 A3 | 10/2016 |
| FR | 3044512 A1 | 6/2017 |
| GB | 2490897 A | 11/2012 |
| WO | 2012013789 A1 | 2/2012 |

OTHER PUBLICATIONS

International Search Report for Application No. PCT/FR2018/052745.
Written Opinion for Application No. PCT/FR2018/052745.
English Translation to FR2882132 Abstract.
English Translation International Search Report for Application No. PCT/FR2018/052516.
International Search Report for Application No. PCT/FR2018/052516.
Written Opinion for Application No. PCT/FR2018/052516.
Decision to Grant (non-English) dated Aug. 31, 2022; EP Application No. 18812241.0; 2 pages.
Intention to Grant (non-English) dated Aug. 31, 2022; EP Application No. 18812241.0; 34 pages.
Intention to Grant (non-English) dated Dec. 20, 2022; EP Application No. 18800249.7; 41 pages.
Search Report (non-English) dated Jul. 23, 2018; FR Application No. 1760818; 2 pages.
Search Report (non-English) dated Jun. 7, 2018; FR Application No. 1760912; 2 pages.
Written Opinion (non-English) dated Jul. 23, 2018; FR Application No. 1760818; 5 pages.
Written Opinion (non-English) dated Jun. 7, 2018; FR Application No. 1760912; 4 pages.
Non-Final Office Action dated Jun. 30, 2023.

* cited by examiner

HEATING APPLIANCE WITH A BUILT-IN BATTERY ARRANGED IN THE INCOMING FRESH AIR FLOW

CROSS REFERENCE TO RELATED APPLICATIONS

This application is a National Stage of PCT Application No. PCT/FR2018/052745 filed on Nov. 7, 2018, which claims priority to French patent application FR 17/60818 filed on Nov. 16, 2017 the contents each of which are incorporated herein by reference thereto.

TECHNICAL FIELD

The present invention concerns an electrical radiator type heating appliance having a case containing, on the one hand, an electric power storage device operating under a direct current intended to be charged by an electric power supply source external to the appliance, on the other hand, at least one heater member which can be powered by the electric power supply source and/or by the electric power storage device.

BACKGROUND

In some heating appliances, it is known to integrate at least one battery associated to the heater member. Such a battery allows storing the electric power used by the heating appliance, in order to space the consumption of electricity over time.

Despite all the advantages that these solutions can have in terms of managing the electric power, these solutions are not yet entirely satisfactory.

Indeed, the battery includes, in known manner, a protective envelope in the form of a case which allows holding and protecting the internal elements of the battery, allowing the assembly to be manipulated in one piece. Such a protective envelope often has a thermal insulation property and therefore has the secondary effect of confining the heat produced by the internal elements, in particular the cells, during the operation of the battery. This generates an increase in the internal temperature of the elements, in particular the cells, and negatively impacts the service life of the battery. In addition to confining the heat inside the battery, the protective envelope also delays the moment when the heat produced by the battery is valued in terms of heat production.

Moreover, the known general organization which implements such a protective envelope makes the industrialization of the heating appliance substantially complex and expensive, which can be problematic on a large scale.

BRIEF SUMMARY

The present invention aims at solving all or part of the drawbacks mentioned above.

In this context, an objective is to provide a heating appliance meeting at least one of the following objectives:
  maintaining the service life of the electrical components as high as possible,
  providing the highest possible efficiency,
  providing an easy and low cost industrialization.

This object can be achieved thanks to providing an electrical radiator type heating appliance having a case containing, on the one hand, an electric power storage device operating under a direct current intended to be charged by an electric power supply source external to the appliance, on the other hand, at least one heater member which can be powered by the electric power supply source and/or by the electric power storage device, the case comprising at least one air inlet arranged in a lower portion of the case to allow air to enter the volume delimited internally by the case and at least one air outlet arranged in an upper portion of the case to allow air to exit said volume, the electric power storage device being implanted across the air flow which circulates, in said volume, from said at least one air inlet to said at least one air outlet, at a location located, seen in the direction of circulation of said flow, between, on the one hand, said at least one air inlet and, on the other hand, said at least one heater member The heating appliance can also meet the technical characteristics presented below, taken individually or in combination.

Said at least one air inlet comprises an opening arranged in the rear face of the case.

The electric power storage device comprises a battery based on an assembly of electrochemical cells.

The case contains two opposite plates framing the electrochemical cells on either side thereof in a direction along which the thickness of the case is counted.

The air flow which circulates from said at least one air inlet to said at least one heater member circulates in the interval delimited between and by said two opposite plates.

The electrochemical cells are in direct thermal contact with the air flow which circulates from said at least one air inlet to said at least one heater member.

The case and the electric power storage device delimit respectively first elements and second elements of the same fastening system ensuring holding the electric power storage device at said location relative to the case.

The air flow circulates by natural convection effect in the case.

BRIEF DESCRIPTION OF THE DRAWINGS

The invention will be even better understood using the detailed description which is exposed below with reference to the appended figures in which.

DETAILED DESCRIPTION

Figure 1:
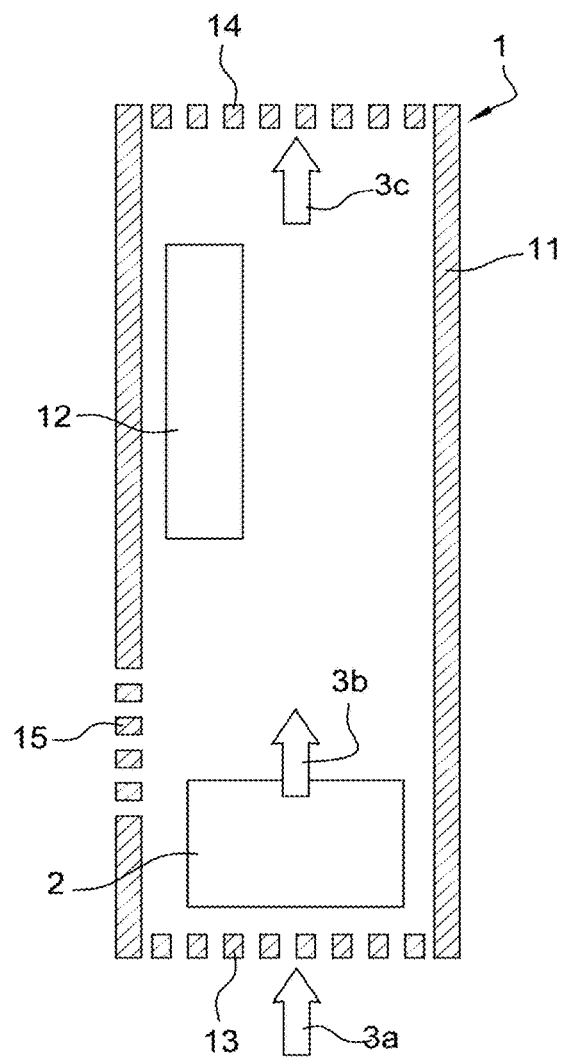
FIG. 1 schematically represents a side sectional view of a first example of a heating appliance according to the invention.

As illustrated in FIG. 1, the electrical radiator type heating appliance 1 comprises a case 11 containing, on the one hand, an electric power storage device 2 operating under a direct current intended to be charged by an electric power supply source external to the heating appliance 1 and, on the other hand, at least one heater member 12 which can be powered by the electric power supply source and/or by the electric power storage device 2.

The case 11 typically consists of a frame formed from a metal material.

The electric power supply source to which the heating appliance 1 is intended to be connected can for example deliver an alternating electric voltage. This is typically the local electrical network.

Alternatively or in a combined manner, the electric power supply source can be configured so as to supply the heating appliance 1 with a direct electric voltage. This is for example the case with renewable energy based power sources, typically photovoltaic panels, fuel cells, supercapacitors or batteries based on electrochemical cells.

The purpose of such an electric power storage device 2 is to be able to store electric power within the heating appliance 1, in particular when inexpensive and/or renewable energy based electric power is available.

Figure 6:
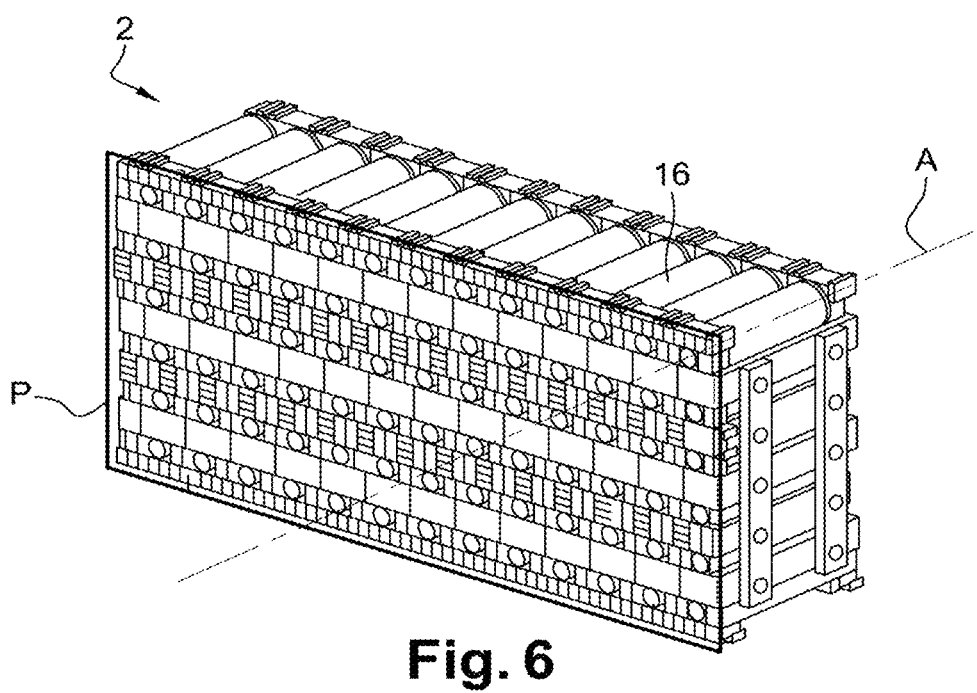
FIG. 6 represents, in perspective, the power storage device as a whole.

According to a non-limiting embodiment, the electric power storage device 2 comprises a battery based on an assembly of electrochemical cells 16, illustrated by FIG. 6. In particular, this assembly can comprise first assembly elements allowing assembling a plurality of electrochemical cells 16 to each other so as to constitute a horizontal row and second assembly elements allowing vertically assembling several rows to each other. The nature and the design of the first and second assembly elements are not limiting in themselves.

The electric power storage device 2 can also comprise, alternatively or in combination with a battery as detailed above, a supercapacitor and/or a fuel cell.

The case 11 comprises at least one air inlet arranged in a lower portion of the case 11 to allow an air flow 3a outside the case 11 to enter the volume delimited internally by the case 11. By way of example, said at least one air inlet may comprise an opening 13 formed in the lower face of the case 11, the air flow 3a outside the heating appliance 1 being able to penetrate into the interior volume of the case 11 through this opening 13. Typically, this opening 13 can be in the form of a grid.

The case 11 also comprises at least one air outlet 14 arranged in an upper portion of the case 11 to allow an airflow 3c to exit the volume delimited internally by the case 11. For example, said or at least one air outlet 14 comprises an opening formed in the upper face of the case 11, the air flow 3c inside the heating appliance 1 and previously heated by said at least one heater member 12 being able to exit the interior volume of the case 11 through this opening. Typically, this opening can be in the form of a grid.

It can be seen from the above that a certain air flow 3a outside the heating appliance 1 can penetrate into the case 11, through said at least one air inlet, in order to be heated inside the case 11. After penetrating the case 11, the air flow circulating between said at least one air inlet and the heater member 12 and intended to be heated by said at least one heater member 12 is marked 3b. The air flow which circulates between the heater member 12 and said at least one air outlet 14, after undergoing a heating by the heater member 12 is intended to exit the case 11 via said at least one air outlet 14, corresponds, in turn, to the air flow 3c.

Advantageously, the electric power storage device 2 is implanted across the air flow 3b, 3c which circulates, in the interior volume of the case 11, from said at least one air inlet to said at least one air outlet 14.

More specifically, the electric power storage device 2 is implanted, relative to the case 11, at a location located, seen in the direction of circulation of the flow 3b, 3c, between, on the one hand, said at least one air inlet and, on the other hand, said at least one heater member 12. In other words, the electric power storage device 2 is implanted across the air flow 3b which circulates from said at least one air inlet to said at least one heater member 12.

In a non-limiting, but nevertheless very advantageous embodiment, corresponding to the first example of FIG. 1, said at least one air inlet comprises, in addition to the opening 13 arranged in the lower face of the case 11, an opening 15 arranged in the rear face of the case 11. This opening 15 allows the air flow heated by the heater member 12 to exit the case 11 in the event of closing said at least one air outlet 14.

This opening 15 allows avoiding the possible overheating of the heater member 12 and also limiting the possible risks of overheating of the electric power storage device 2, in order to avoid a degradation and a reduction in the service life of said electric power storage device.

Figure 2:
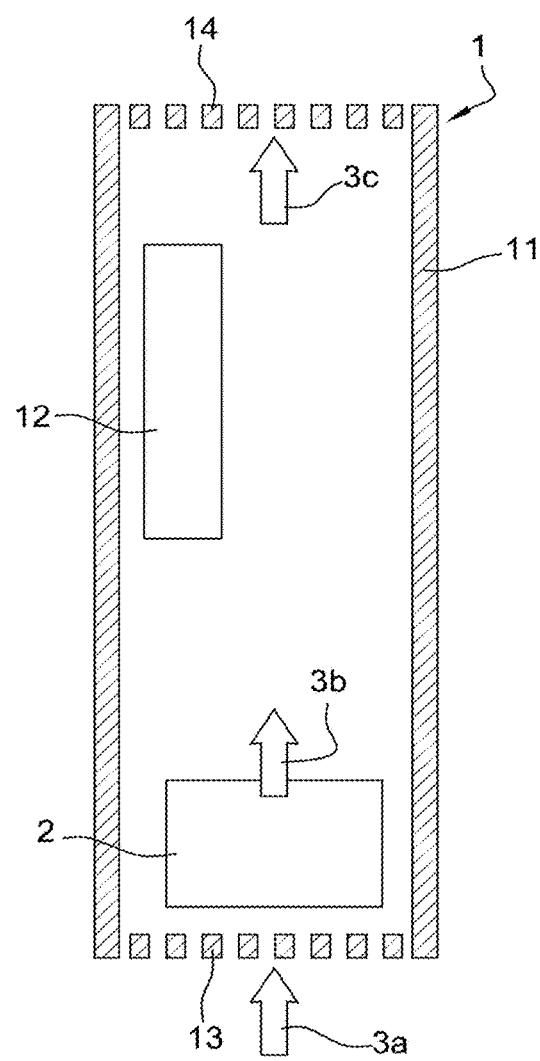
FIG. 2 schematically represents a side sectional view of a second example of a heating appliance according to the invention.

However, this opening 15 is optional and the second example of a heating appliance 1 according to the invention which is schematically illustrated in FIG. 2 is devoid of such an opening 15.

Said at least one heater member 12 can in particular comprise at least one radiating heater body and/or at least one heat transfer fluid heating device. Such a radiating heater body can comprise at least one electrical resistance intended to be supplied by a direct voltage, for example in the range of 50V. The radiating heater body can also further comprise a resistor intended to be supplied by an alternating voltage, for example 230V, allowing using, in conjunction, the two types of heater sources in order to obtain a point heat effect to compensate for thermal reductions, for example night or day reductions.

It is very advantageous to provide that the electrochemical cells 16 are in direct thermal contact with the air flow 3b which circulates from said at least one air inlet to said at least one heater member 12.

The thermal contact of the electrochemical cells 16 with the air flow 3b firstly allows fulfilling a first function consisting in heating the air flow 3b before it reaches the heater member 12, allowing promoting the efficiency of the heating appliance 1 by avoiding the internal thermal losses.

The thermal contact of the electrochemical cells 16 with the air flow 3a allows fulfilling a second function consisting in cooling the electrochemical cells 16 by thermal transfer of the calories from the electrochemical cells 16 to the air flow 3b, which partially results in maintaining the electrochemical cells 16 at a temperature close to that of the air flow 3a and thus extending their service life.

It is therefore noted that there is a real advantageous synergy between these two functions.

Thus, the integration of the electric power storage device 2, which is advantageously devoid of a protective envelope unlike the prior art, directly into the case 11 which also contains said at least one heater member 12 allows a facilitated and cost-effective industrialization of the heating appliance 1.

These arrangements, although advantageous, are however not limiting. Indeed, it is possible to provide that the electric power storage device 2 is provided with an envelope which is at least partially open in order to let the air flow pass.

Figure 5:
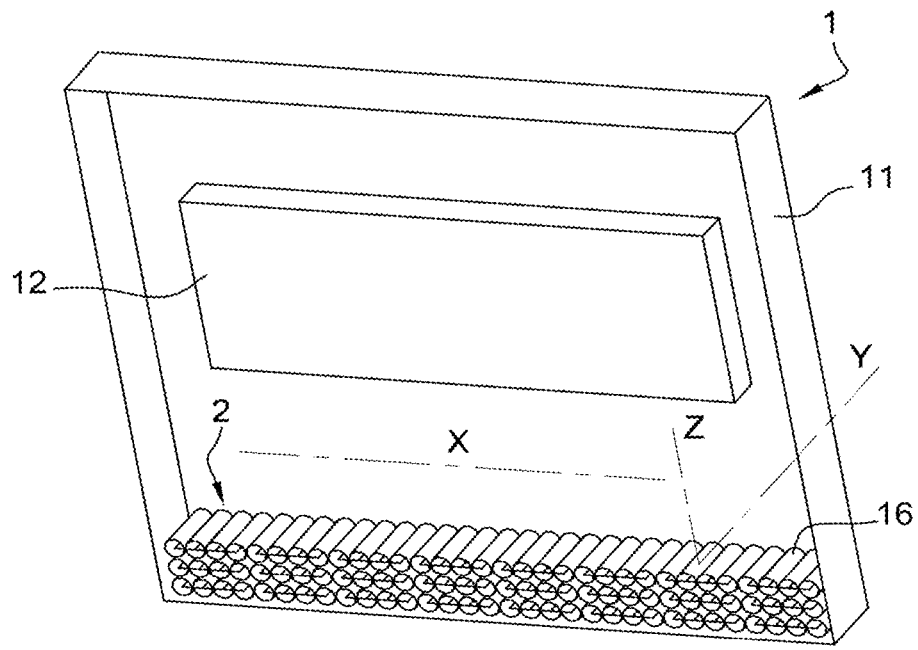
FIG. 5 represents, in perspective, the heating appliance of FIG. 2.

Advantageously, the case 11 contains two opposite plates framing the electrochemical cells 16 on either side thereof along a direction (denoted Y in FIG. 5) in which the thickness of the case 11 is counted.

Figure 3:
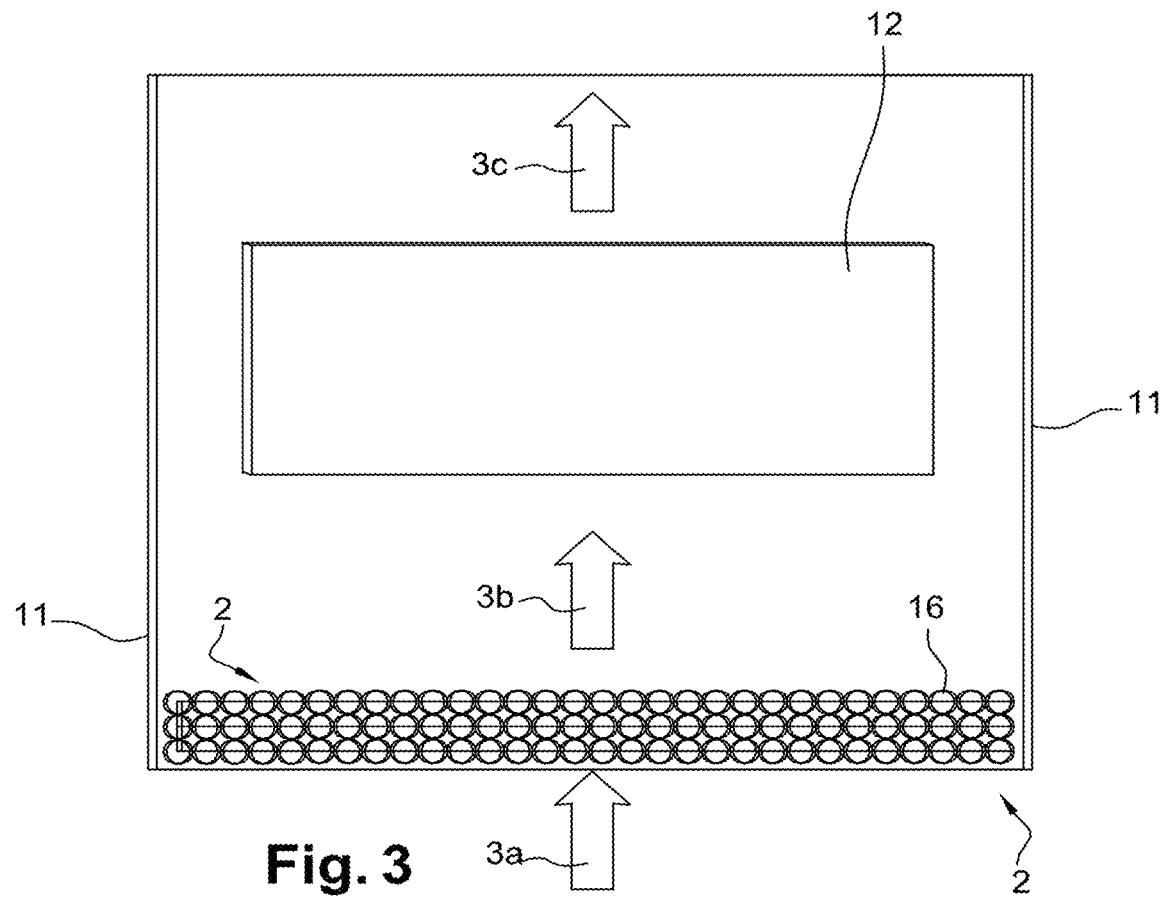
FIG. 3 represents a front sectional view of the heating appliance of FIG. 2.

As illustrated in FIG. 3, the air flow 3b, which circulates from said at least one air inlet to said at least one heater member 12, circulates in the interval delimited between, and by, the two opposite plates comprised in the case 11.

Thus, such opposite plates have the advantages of ensuring a protection of the electrochemical cells 16 and of guiding the air flow 3b, for a better efficiency of the heating appliance 1 and a good robustness.

Figure 4:
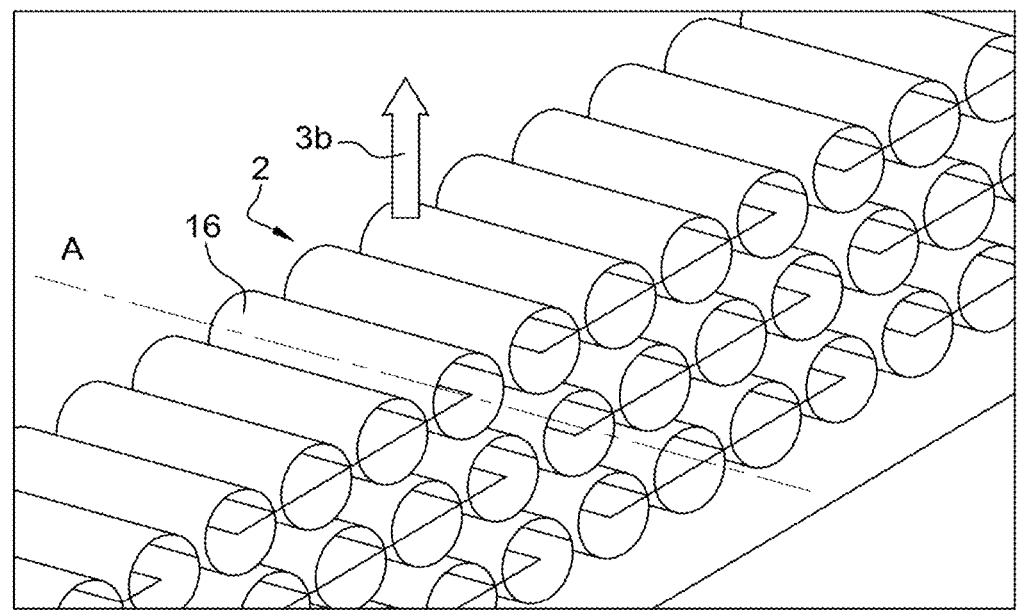
FIG. 4 represents a portion of an example of an electric power storage device that can be used for the appliances of FIGS. 1 to 3.

According to one embodiment, as illustrated in FIGS. 4 and 6, each electrochemical cell 16 can be in the form of a cylinder whose axis A is perpendicular to the reference plane P defined by one of the two opposite plates. Such an orientation of the cells 16, generally perpendicular to the direction (denoted Z) of circulation of the air flow 3b with which they are in thermal contact, promotes the quality of this heat exchange in a simple, efficient and cost-effective manner. Typically, the direction Z corresponds to the vertical direction once the heating appliance is fastened to the wall.

In the represented variant, the electrochemical cells 16 are staggered, within the same horizontal row, in a direction denoted X jointly perpendicular to Z and Y. The vertical stack of the vertical rows on top of each other takes place along the direction Z.

Figure 7:
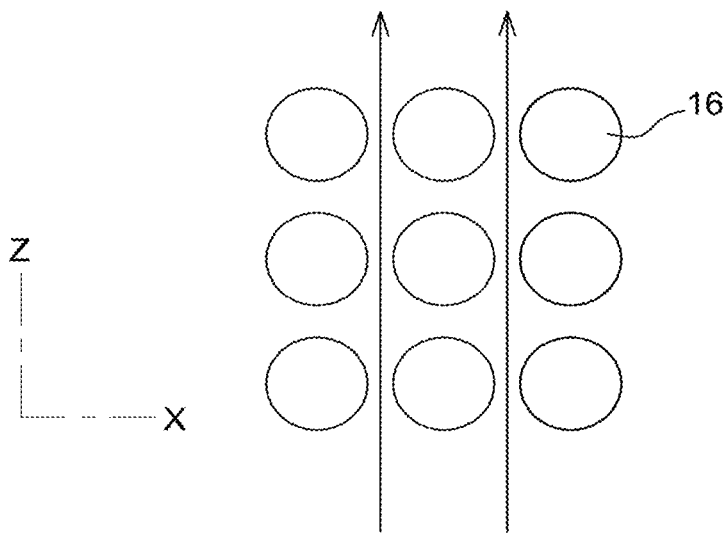
FIG. 7 represents a first embodiment of the power storage device.

In a first embodiment of FIG. 7, the horizontal rows of cells 16 are stacked along Z such that the electrochemical cells 16 are aligned in the direction Z from one horizontal row to the other. As a result, the flow of fresh air between the electrochemical cells 16 is relatively rectilinear in the direction Z, limiting the pressure losses. This flow is symbolized by the vertical arrows in FIG. 7.

Figure 8:
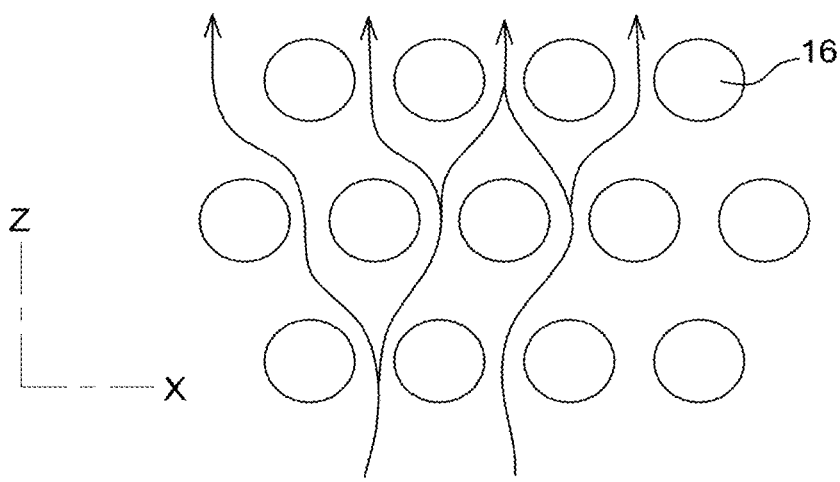
FIGS. 8 and 9 show a second embodiment of the power storage device.
Figure 9:
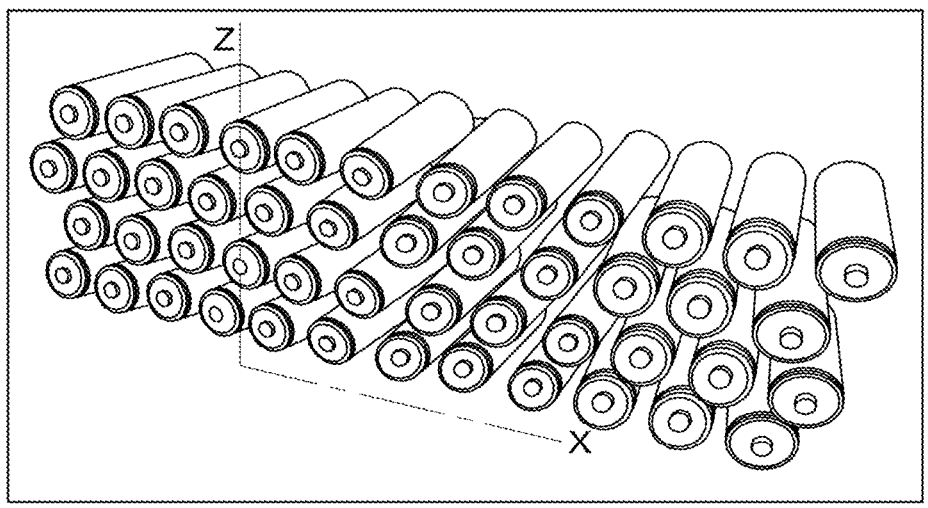

In the second embodiment of FIGS. 8 and 9, the horizontal rows of cells 16 are stacked along Z such that, from one horizontal row to the other, the electrochemical cells 16 are offset in the direction X, finally resulting in a distribution of the cells in a staggered manner. This has the advantageous effect of causing deviations for the air flow, symbolized by the zigzag arrows in FIG. 8, which ultimately allows creating turbulence in the air flow in order to improve the heat exchanges between the air and the cells 16.

These very advantageous arrangements are not, however, limiting since the orientation of the axis A of the cells 16 can be arbitrary relative to the direction of circulation of the air flow 3b, for example by being oriented parallel to the reference plane P, which has the advantage of making the thickness of the heating appliance potentially small.

It should be noted that the air flows 3b, 3c circulate naturally in the case 11, that is to say, without a vacuum or overpressure system. On the contrary, the air flow circulates by natural convection effect in the case 11 originating from the heat released by the heater member 12 as well as by the electric power storage device 2.

In a manner not represented in details, the case 11 and the electric power storage device 2 respectively delimit first elements and second elements of the same fastening system ensuring holding the electric power storage device at said location relative to the case 11. This fastening system can operate on principles of snap-fitting, screwing or equivalent.

Thus, it results from the above that the heating appliance 1 allows maintaining the service life of the electric power storage device 2 as high as possible, whether in normal operation thanks to thermal transfer with the air flow circulating in the case or in critical operation in the case of an abnormal heating.

On the other hand, the heating appliance 1 has the highest possible efficiency because of the limitation of internal thermal losses due to the useful recovery of the calories generated by the electric power storage device 2 during its operation.

Finally, the use of an electric power storage device 2 implanted so as to promote the thermal transfer with the air flow circulating between the air inlet and the heater member, and advantageously devoid of a protective envelope unlike known techniques, promotes an easy and cost-effective industrialization of the heating appliance 1.

The invention claimed is:

1. An electrical radiator heating appliance having a case containing, an electric power storage device operating under a direct current configured to be charged by an electric power supply source external to the appliance, at least one heater member that is powered by the electric power supply source and/or by the electric power storage device, the case comprising at least one air inlet arranged in a lower portion of the case to allow air to enter a volume delimited internally by the case and at least one air outlet arranged in an upper portion of the case to allow air to exit the volume, wherein the electric power storage device is implanted across an air flow which circulates, in the volume, from the at least one air inlet to the at least one air outlet, at a location located, in a direction of circulation of the air flow, between the at least one air inlet and the at least one heater member.

2. The heating appliance according to claim 1, wherein the at least one air inlet comprises an opening arranged in a rear face of the case.

3. The heating appliance according to claim 1, wherein the electric power storage device comprises a battery based on an assembly of electrochemical cells.

4. The heating appliance according to claim 3, wherein the case contains two opposite plates framing the electrochemical cells on either side thereof in a direction along which a thickness of the case is counted.

5. The heating appliance according to claim 4, wherein the air flow which circulates from the at least one air inlet to the at least one heater member circulates in an interval delimited between and by the two opposite plates.

6. The heating appliance according to claim 3, wherein the electrochemical cells are in direct thermal contact with the air flow which circulates from the at least one air inlet to the at least one heater member.

7. The heating appliance according to claim 1, wherein the case and the electric power storage device delimit respectively first elements and second elements of a same fastening system ensuring holding the electric power storage device at the location relative to the case.

8. The heating appliance according to claim 1, wherein the air flow circulates by natural convection effect in the case.

9. The heating appliance according to claim 1, wherein the electric power storage device comprises a battery based on an assembly of electrochemical cells.

10. The heating appliance according to claim 9, wherein the case contains two opposite plates framing the electrochemical cells on either side thereof in a direction along which a thickness of the case is counted.

11. The heating appliance according to claim 10, wherein the air flow which circulates from the at least one air inlet to the at least one heater member circulates in an interval delimited between and by the two opposite plates.

12. The heating appliance according to claim 11, wherein the electrochemical cells are in direct thermal contact with the air flow which circulates from the at least one air inlet to the at least one heater member.

13. The heating appliance according to claim 4, wherein the electrochemical cells are in direct thermal contact with the air flow which circulates from the at least one air inlet to the at least one heater member.

14. The heating appliance according to claim 12, wherein the case and the electric power storage device delimit respectively first elements and second elements of a same fastening system ensuring holding the electric power storage device at the location relative to the case.

15. The heating appliance according to claim 14, wherein the air flow circulates by natural convection effect in the case.

16. The heating appliance according to claim 2, wherein the case and the electric power storage device delimit respectively first elements and second elements of a same fastening system ensuring holding the electric power storage device at the location relative to the case.

17. The heating appliance according to claim 3, wherein the case and the electric power storage device delimit respectively first elements and second elements of a same fastening system ensuring holding the electric power storage device at the location relative to the case.

18. The heating appliance according to claim 4, wherein the case and the electric power storage device delimit respectively first elements and second elements of a same fastening system ensuring holding the electric power storage device at the location relative to the case.

19. The heating appliance according to claim 2, wherein the air flow circulates by natural convection effect in the case.

20. The heating appliance according to claim 3, wherein the air flow circulates by natural convection effect in the case.

* * * * *